Dec. 4, 1928.
R. W. MANNING
TAPPET FOR VALVES
Filed March 31, 1927
1,693,651
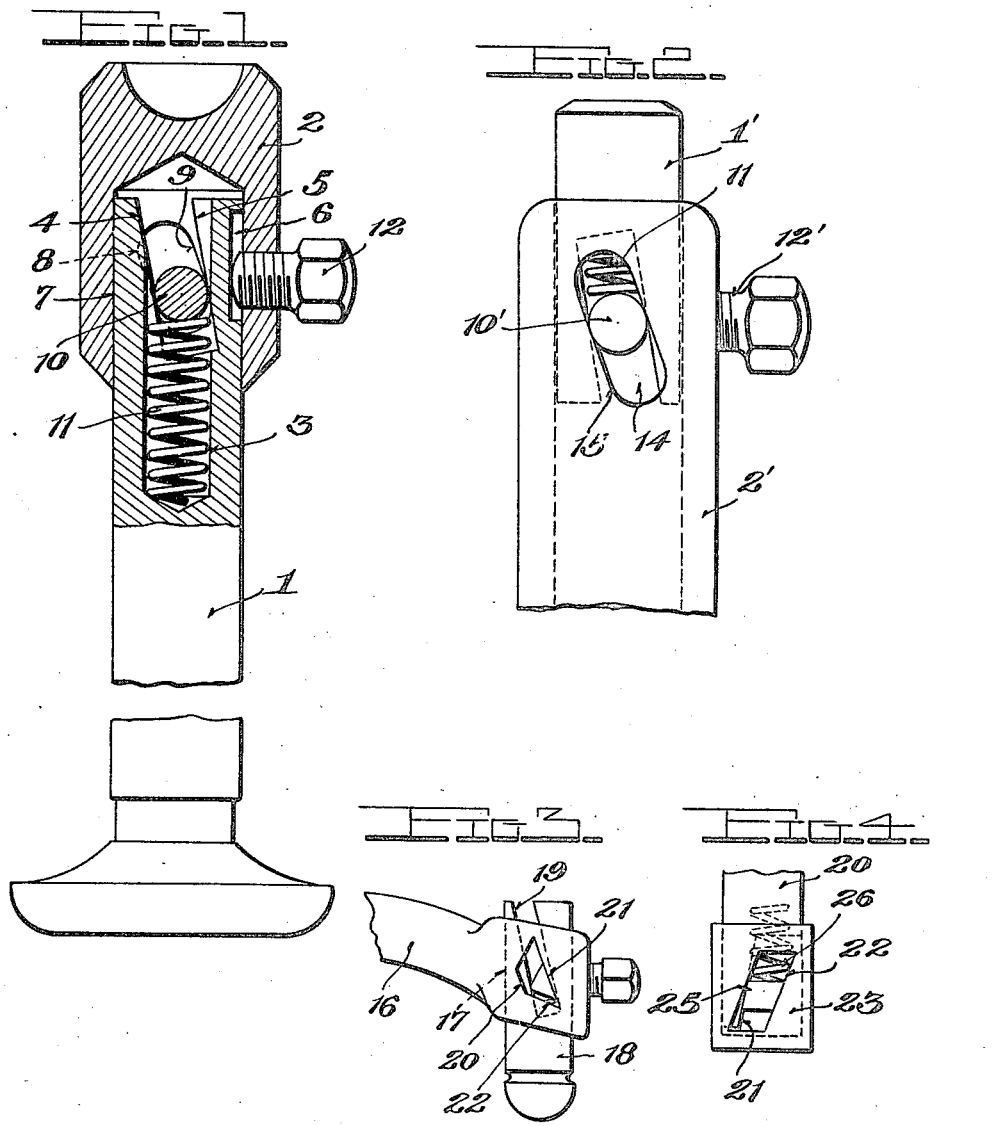
Inventor
Rodney W. Manning
By Joseph A. Miller
Attorney Patented Dec. 4, 1928.

1,693,651

UNITED STATES PATENT OFFICE.

RODNEY W. MANNING, OF RIVERSIDE, RHODE ISLAND.

TAPPET FOR VALVES.

Application filed March 31, 1927. Serial No. 179,867.

This invention relates to certain new and useful improvements in tappets for valves and has for its primary object to provide a device of this character which is of improved construction and effective in action, which is simple and which can be economically assembled and produced.

A further object of the invention is to provide a device of this character which is automatic in action and which minimizes reverse movement of the parts.

The invention still further aims to provide a device of this kind which can be easily and quickly returned to zero setting.

In the drawings:

Figure 1 is a side elevation partly broken away and in section of one form of the invention, and Figures 2, 3 and 4 are fragmentary side elevations of modified forms of the invention.

In proceeding in accordance with the present invention two relatively movable members 1 and 2 are employed, the members being telescopically related as shown in Figure 1. The member 1 is provided with a bore 3 which extends through one end thereof and is further provided with an inclined slot having parallel walls 4 and 5, the slot communicating with the bore 3 and extending through the end of the member. The member 1 is further provided with an axial cutout 6 disposed in its periphery. The member 2 has a bore 7 in which the outer end of the member 1 is received and is provided with a slot having parallel walls 8 and 9, the slots of the members 1 and 2 being arranged so as to cross one another at a slight angle. A circular pin 10 is received in the slots and is tensioned by a coil spring 11 which latter is received in the slots and is tensioned by a coil spring 11 which latter is received in the bore 3. A set screw 12 is carried by the member 2 and has its free end engaging in the groove 6.

In operation, it will be noted that when the set screw is loosened the pin 10 under the tension of its spring 11 will ride on the wall 9 of the member 2 and move the latter outwardly and due to the engagement of the pin with the walls 4 and 5 of the member 1, retrograde movement of the member 2 is prevented to an almost negligible extent.

In Figure 2 a modification is shown and wherein the member 2' is in the form of a sleeve while the member 1 is received on the interior of the sleeve. The set screw 12' functions in the same manner as the set screw 12 in Fig. 1 and the pin 10' with its spring 11' and the slots 14 and 15 also function as in Figure 1.

Figure 3 shows a further modification wherein an arm 16 is formed with a transverse bore 17 in which the tappet 18 is received, the latter having an inclined slot 19 which is crossed by the slot 20 of the arm 16. In this form of the invention, a pin of diamond cross-section 21 is employed tensioned by spring 22, the operation being the same as that described in the above.

In Figure 4 a member 20 is employed having an inclined slot 21 the latter crossed by an inclined slot 22 formed in a thimble 23. An actuating member 25 tensioned by a coil spring 26 is employed to move the thimble 23 as in the other forms of the invention.

In practice the tappet locks 12, etc., are first loosened and the motor is then caused to run for a fraction of a minute. As each valve closes, the present invention takes up all clearance or lost motion between the cam and the valve stem. The set screws are then tightened and the motor again run for a few minutes. The first few impulses of the cam working against the valve spring will seat the movable member more firmly against the pins or blocks, thus leaving the necessary clearance for the proper operating of the motor.

Having thus described my invention what I claim as new and desire to secure by Letters Patent is:—

1. In a tappet, a pair of relatively movable members, means to connect the members for sliding movement, each of said members having an inclined slot, the slots crossing one another, a spring actuated pin receivable in the slots, and means for locking the members together against the action of the pin.

2. In a tappet, a pair of relatively movable members, means to connect the members for sliding movement, each of said members having an inclined slot, the slots crossing one another, and a spring actuated pin receivable in the slots.

3. In a tappet, a pair of telescopically connected members each having an angular wall, means engaging the walls for effecting movement of the members, means for actuating the last-named means, and means for locking the members against movement.

4. In a tappet, a pair of telescopic members each having an angular surface, a spring actuated pin engaging said surfaces, one of said surfaces cooperating with the pin to effect spreading of the members, and the other surface engaging the pin to prevent retrograde movement of the latter.

5. In a tappet, a pair of telescopically connected members each having an angular wall, means engaging the walls for effecting movement of the members, and means for actuating the last-named means.

6. In a tappet, a pair of telescopic members each member having a cam surface, and means engageable with said cam surface to effect spreading of the members and to prevent retrograde movement of the spreading movement.

7. In a tappet, a pair of telescopic members, cam means carried by one of the members, and tensioned means carried by the other of said members for operating against the cam means to effect separation of the members.

8. In a tappet, a pair of telescopic members, cam means carried by one of the members, and slidable spring tensioned means carried by the other of said members for operating against the cam means to separate the members.

9. In a tappet, a pair of separable members, cam means carried by one of the members, and a slidable spring actuated pin carried by the other of said members for operating against the cam means to separate the members.

10. In a tappet, a pair of telescopic members, means disposed between said members to cause relative movement thereof away from each other, and means for holding the members against movement by said first named means while permitting the members to be moved toward each other by a force greater than that of the holding means.

11. In a tappet, a pair of telescopic members, means disposed between said members to cause relative movement thereof away from each other, means disposed through the members for preventing relative movement of the members toward each other, and means for holding the members against movement by said first named means while permitting the members to be moved toward each other by a force greater than that of the holding means and the second named means.

12. In a tappet, a pair of telescopic members, means disposed between said members to cause relative movement thereof away from each other, means disposed through the members for preventing relative movement of the members toward each other, and means for holding the members against relative movement in either direction while permitting the members to be moved toward each other by a force greater than that of the holding means and the second named means.

In testimony whereof I have hereunto signed my name to this specification.

RODNEY W. MANNING.